United States Patent [19]

Gindre et al.

[11] Patent Number: 5,496,905
[45] Date of Patent: Mar. 5, 1996

[54] PAINT RESIN FOR USE IN PARAFFINIC SOLVENTS

[75] Inventors: Andre Jean V. Gindre, Gif sur Yvette; Saadane Rezaiguia, Bruyeres le Chatel, both of France

[73] Assignee: The Goodyear Tire & Rubber Company, Akron, Ohio

[21] Appl. No.: 402,432

[22] Filed: Mar. 10, 1995

[51] Int. Cl.$^6$ ................................................ C08F 220/12
[52] U.S. Cl. ........................ 526/329.2; 524/81; 524/561
[58] Field of Search ................................. 526/329.2

[56] References Cited

U.S. PATENT DOCUMENTS

| | | | |
|---|---|---|---|
| 3,681,305 | 8/1972 | Tirpak et al. | 526/329.2 |
| 3,928,266 | 12/1975 | Scohy et al. | 526/329.2 X |
| 4,370,460 | 1/1983 | Neubert et al. | 526/329.2 |
| 4,432,968 | 2/1984 | Page et al. | 424/81 |

OTHER PUBLICATIONS

Chem Abstr. 82:87844.

*Primary Examiner*—Mark Nagumo
*Attorney, Agent, or Firm*—Alvin T. Rockhill

[57] ABSTRACT

This invention discloses a resin which is particularly useful in making paraffinic solvent based paints, said resin being comprised of repeat units which are derived from (a) about 10 to about 55 weight percent para-tertiary-butyl styrene, (b) 0 to about 40 weight percent vinyl aromatic monomers, (c) about 20 to about 80 weight percent alkyl methacrylate monomers, and (d) about 2 to about 25 weight percent alkyl acrylate monomers. These resins exhibit good hardness and improved resistance to ultraviolet light. The subject invention further discloses a paint formulation which is comprised of (a) a paraffinic solvent; (b) a resin which is comprised of repeat units which are derived from (i) about 10 to about 55 weight percent para-tertiary-butyl styrene, (ii) 0 to about 40 weight percent vinyl aromatic monomers, (iii) about 20 to about 80 weight percent alkyl methacrylate monomers, and (iv) about 2 to about 25 weight percent alkyl acrylate monomers; and (c) one or more pigments.

16 Claims, No Drawings

PAINT RESIN FOR USE IN PARAFFINIC SOLVENTS

BACKGROUND OF THE INVENTION

Standard mineral spirits used in making typical paint formulations normally contain about 20 percent aromatic compounds. For various reasons including environmental concerns there is a current demand for paint resins which are soluble in paraffinic solvents which do not contain aromatic compounds. However, it is also important for the resin used in such applications to maintain a high level of hardness and ultra-violet light resistance. This desirable combination of properties has heretofore been elusive. More specifically, in the past it has only been possible to improve solubility in paraffinic solvents by compromising hardness and ultra-violet light resistance.

SUMMARY OF THE INVENTION

This invention discloses a resin for paints which is highly soluble in paraffinic solvents and which is resistant to ultra-violet light. These resins contain from about 10 weight percent to about 55 weight percent para-tertiary-butyl styrene (PTBS). These resins also contain about 20 weight percent to about 80 weight percent of at least one alkyl methacrylate monomer, from about 2 weight percent to about 25 weight percent alkyl acrylate monomer, and optionally up to about 40 weight percent of a vinyl aromatic monomer in addition to the PTBS.

This invention more specifically discloses a resin which is particularly useful in making paraffinic solvent based paints, said resin being comprised of repeat units which are derived from (a) about 10 to about 35 weight percent para-tertiary-butyl styrene, (b) 0 to about 40 weight percent vinyl aromatic monomers, (c) about 20 to about 80 weight percent alkyl methacrylate monomers, and (d) about 2 to about 25 weight percent alkyl acrylate monomers.

The subject invention further discloses a paint formulation which is comprised of (a) a paraffinic solvent; (b) a resin which is comprised of repeat units which are derived from (i) about 10 to about 55 weight percent para-tertiary-butyl styrene, (ii) 0 to about 40 weight percent vinyl aromatic monomers, (iii) 10 about 20 to about 80 weight percent alkyl methacrylate monomers, and (iv) about 2 to about 25 weight percent alkyl acrylate monomers; and (c) one or more pigments.

DETAILED DESCRIPTION OF THE INVENTION

The paint resins of this invention are synthesized utilizing free radical emulsion polymerization techniques. This is carried out by adding a PTBS, optionally additional vinyl aromatic monomers, an alkyl methacrylate monomer, and an alkyl acrylate monomer to water to form an aqueous polymerization medium. The aqueous polymerization medium will also normally contain a required amount of a surfactant. Polymerization of the monomers is then initiated with a free radical generator to produce a latex of the resin. The latex made is subsequently coagulated to recover the resin.

In synthesizing the resins of this invention generally from about 10 weight percent to about 55 weight percent PTBS, from about 20 weight percent to about 80 weight percent alkyl methacrylate monomers, from about 2 weight percent to about 25 weight percent alkyl acrylate monomers, and from 0 to about 40 weight percent vinyl aromatic monomers in addition to the PTBS are polymerized. These resins can be used for manufacturing interior and exterior coatings. In making resins for interior coatings normally from about 10 weight percent to about 30 weight percent PTBS, from about 25 weight percent to about 45 weight percent alkyl methacrylate monomers, from about 8 weight percent to about 25 weight percent alkyl acrylate monomers, and from 20 to about 40 weight percent vinyl aromatic monomers in addition to the PTBS are polymerized. Resins for interior paints preferably contain from about 15 weight percent to about 25 weight percent PTBS, from about 30 weight 10 percent to about 40 weight percent alkyl methacrylate monomers, from about 10 weight percent to about 20 weight percent alkyl acrylate monomers, and from 25 to about 35 weight percent vinyl aromatic monomers in addition to the PTBS. In making resins for exterior coatings normally from about 15 weight percent to about 35 weight percent PTBS, from about 60 weight percent to about 80 weight percent alkyl methacrylate monomers, from about 1 weight percent to about 10 weight percent alkyl acrylate monomers, and from 0 to about 15 weight percent vinyl aromatic monomers in addition to the PTBS are polymerized. Resins for exterior paints preferably contain from about 20 weight percent to about 30 weight percent PTBS, from about 65 weight percent to about 75 weight percent alkyl methacrylate monomers, and from about 2 weight percent to about 8 weight percent alkyl acrylate monomers.

The alkyl acrylate monomers that can be used in the resins of this invention generally have the structural formula:

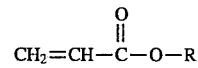

wherein R represents an alkyl group containing from 1 to 10 carbon atoms. The alkyl group in such alkyl acrylate monomers will preferably contain from 2 to 8 carbon atoms with alkyl groups which contain 8 carbon atoms being most preferred. Accordingly, ethyl acrylate,-propyl acrylate, butyl acrylate, pentyl acrylate, hexyl acrylate, and 2-ethyl hexyl acrylate are preferred alkyl acrylate monomers with 2-ethylhexyl acrylate being the most preferred. The alkyl groups in such alkyl acrylate monomers can be straight chained or branched. Thus, normal-propyl acrylate, isopropyl acrylate, normal-butyl acrylate, or tertiary-butyl acrylate can be employed.

The vinyl aromatic monomers which can optionally be included include all of those in addition to PTBS which are known to polymerize in free radical systems. Such vinyl aromatic monomers typically contain from 8 to 20 carbon atoms. Usually, the vinyl aromatic monomer will contain from 8 to 14 carbon atoms. Some representative examples of vinyl aromatic monomers that can be utilized include styrene, 1-vinyl napthalene, 2-vinyl napthalene, 3-methyl styrene, 4-propyl styrene, 4-cyclohexyl styrene, 4-dodecyl styrene, 2-ethyl-4-benzyl styrene, 4-(phenylbutyl) styrene, and the like. Styrene, para-methyl styrene, and mixtures of para-methyl styrene and ortho-methyl styrene are generally the most preferred vinyl aromatic monomers.

The alkyl methacrylate monomers that can be used have the structural formula:

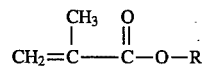

wherein R represents an alkyl group containing from 1 to 10 carbon atoms ($R=C_nH_{2n+}$ with n being an integer from 1 to 8). The alkyl groups in such alkyl methacrylate monomers can be straight chained or branched. Methyl methacrylate, ethyl methacrylate, propyl methacrylate, isobutyl methacrylate, and n-butyl methacrylate are representative examples of alkyl methacrylate monomers which can be used. The alkyl group in the alkyl methacrylate monomer will preferably contain from 1 to 4 carbon atoms with alkyl groups which contain 4 carbon atoms being most preferred. Accordingly, isobutyl methacrylate is a highly preferred monomer.

Essentially any type of free radical generator can be used to initiate such free radical emulsion polymerizations. For example, free radical generating chemical compounds, ultraviolet light or radiation can be used. In order to ensure a satisfactory polymerization rate, uniformity, and a controllable polymerization, free radical generating chemical agents which are water soluble under the polymerization conditions are generally used with good results.

Some representative examples of free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, 4,4' azobis(4-cyanovaleric acid), azodiisobutyronitrile, 2-t-butylazo-1-cyanocylohexane, 1-t-amylazo-1-cyanocyclohexane, and the like; the various alkyl perketals, such as 2,2-bis-(t-butylperoxy) butane, ethyl 3,3-bis(t-butylperoxy)butyrate, 1,1-di-(t-butylperoxy) cyclohexane, and the like. Persulfate initiators, such as potassium persulfate and ammonium persulfate are especially useful in such aqueous emulsion polymerizations.

The amount of initiator employed will vary with the desired molecular weight of the resin being synthesized. Higher molecular weights are achieved by utilizing smaller quantities of the initiator and lower molecular weights are attained by employing larger quantities of the initiator. However, as a general rule from 0.005 to 1 phm (parts by weight per 100 parts by weight of monomer) of the initiator will be included in the reaction mixture. In the case of metal persulfate initiators most commonly from 0.1 to 0.5 phm will be employed in the polymerization medium.

The emulsifiers used in the polymerizations of this invention may be charged at the outset of the polymerization or may be added incrementally or proportionately as the polymerization reaction proceeds. A wide variety of types of emulsifiers or surfactants, such as anionic, cationic, nonionic and amphoteric emulsifiers, can be utilized in the process of this invention. Rosin acid or fatty acid emulsifiers are normally utilized.

Synthetic surfactants can also be used. For instance, salts of alkyl sulfates, alkyl sulfonates and alkyl phosphates can be employed as the emulsifier. The alkyl groups in these compounds generally contain from 1 to 30 carbon atoms. Normally the alkyl groups in these surfactants will contain from 8 to 20 carbon atoms. The surfactant utilized will normally be a sodium, potassium, magnesium or ammonium salt. Sodium lauryl sulfate, ammonium lauryl sulfate, sodium dodecyl benzene sulfonate, and sodium dodecyl sulfate are some representative examples of highly suitable emulsifiers.

Generally from about 1.5 phm to about 7 phm of emulsifier is utilized in preparing the aqueous polymerization medium. In most cases, it will be preferred to utilize from about 4 phm to 6.5 phm of emulsifier. It is normally more preferred to utilize from about 5.5 phm to about 6.5 phm of the emulsifier. The precise amount of emulsifier required in order to attain optimal results will, of course, vary with the specific emulsifier being used. However, persons skilled in the art will be able to easily ascertain the specific amount of emulsifier required in order to attain optimal results.

The free radical emulsion polymerization will typically be conducted at a temperature which is within the range of about 20° C. to about 95° C. It is generally preferred for the polymerization to be carried out at a temperature which is within the range of 30° C. to about 80° C. It is typically more preferred to utilize a polymerization temperature which is within the range of about 45° C. to about 70° C. To increase conversion levels, it can be advantageous to increase the temperature as the polymerization proceeds. For instance, it is desirable for the polymerization temperature could be maintained at about 45° C. at the beginning of the polymerization and increased to a final temperature of about 70° C. at the end of the polymerization. After the polymerization has been completed the resin can be recovered from the latex by using standard coagulation and drying techniques.

The resins of this invention can be employed in manufacturing paraffinic solvent based paints. These paints utilize organic solvents which contain virtually no aromatic compounds. For instance, the paraffinic solvents employed in making the paints of this invention will normally contain less than about 2 weight percent aromatic compounds. It is normally preferred for the organic solvent used in making such paints to contain less than about 1 percent aromatic compounds.

The paints of this invention are comprised of the paraffinic solvent, the resin, and one or more pigments. Such paints can optionally contain fillers, plasticizers, stabilizers, dryers, fungicides, insecticides, antifouling agents, and anticorrosive agents.

Pigments are normally added to paint formulations to impart color and hiding power to the coating. Titanium dioxide is an example of a widely used pigment which imparts hiding power and a white color. Mineral pigments, such as oxides of iron and chromium, organic pigments, such as phthalocyanine, and active anticorrosive pigments, such as zinc phosphate, are representative examples of other widely used pigments.

Fillers are normally inexpensive materials which are added to the paint formulation to attain the desired consistency and non-settling characteristics. Fillers can also improve a coatings physical properties, such as resistance to cracking and abrasion. Some representative examples of widely utilized fillers include chalks, clays, micas, forms of barites and talcs, and silica.

Driers are chemical compounds, such as salts of cobalt, lead, manganese, barium, and zinc, which speed up drying. Plasticizers are agents which control the hardness of the film or which impart flexibility. Stabilizers are chemical agents which neutralize the destructive effects of heat and ultraviolet light. Fungicides and insecticides are commonly added to interior and exterior house paints. Antifouling compounds are commonly added to marine paints to inhibit marine growth.

This invention is illustrated by the following examples which are merely for the purpose of illustration and are not to be regarded as limiting the scope of the invention or the manner in which it can be practiced. Unless specifically indicated otherwise all parts and percentages are given by weight.

EXAMPLE 1

In this experiment a resin for interior coatings was synthesized by terpolymerizing PTBS, isobutyl methacrylate, and 2-ethylhexyl acrylate. In the procedure used 117.66 phm (parts by weight per 100 parts by weight of monomer) of water, 0.135 phm of potassium hydroxide, 0.35 phm of anhydrous sodium sulfate, 6.28 phm of rosin acid soap, 0.30 phm of potassium persulfate, 50 phm of PTBS, 36 phm of isobutyl methacrylate, 14 phm of 2-ethylhexyl acrylate, and 0.35 phm of t-dodecyl mercaptan were charged into a polymerization reactor. The temperature at the start of the polymerization was about 45° C. During the polymerization the temperature of the polymerization medium increased to about 68° C over a period of about 6 to 7 hours. The latex prepared by this procedure was subsequently coagulated with the resin made being recovered.

The solution and polymer properties of the resin made were then determined and compared with those of Plioway®EC1 resin. Plioway®EC1 resin is made by The Goodyear Tire & Rubber Company using the same procedure as was utilized in this experiment except that para-methyl styrene is employed in place of the PTBS. The properties of the PTBS containing resin made in this experiment and Plioway®EC1 are shown in Table I.

The viscosity at 50 sec$^{-1}$ of the PTBS containing resin and the Plioway®EC1 resin in both Isopar G solvent and Exxsol D30 solvent are shown in Table I. It should be noted that Exxsol D30 solvent contains less than one percent aromatics and that Isopar G contains virtually no aromatic compounds. As can be seen in Table I the PTBS containing resin is much more soluble in these nonaromatic solvents than is the Plioway®EC1 resin.

Table I also shows the C.S.T. of 20 weight percent solutions of the two resins in Isopar G solvent and Exxsol D30 solvent. The C.S.T. temperatures reported in Table I were determined by freezing the polymer solution and then raising the temperature and recording the point at which cloudiness disappears. The weight average molecular weight (Mw), number average molecular weight (Mn), polydispersity (Pd), and glass transition temperature (Tg) of the resins are also reported in Table I.

TABLE I

| Property | Plioway ® EC1 | PTBS Resin |
| --- | --- | --- |
| Viscosity in ISOPAR G | 38 mPa.s | 21 mPa.s |
| Viscosity in EXXSOL D30 | 16 mPa.s | 9 mPa.s |
| C.S.T. in ISOPAR G | 10° C. | −15° C. |
| C.S.T. in EXXSOL D30 | −6° C. | −20° C. |
| Mw | 80,000 | 90,320 |
| Mn | 27,000 | 40,800 |
| Pd | 2.9 | 2.2 |
| Tg(midpoint) | 56° C. | 81° C. |

It is normally important for the resin to have a glass transition temperature of greater than about 50° C. to insure satisfactory hardness. The resin made with PTBS had a glass transition temperature (midpoint) of 81° C. which is indicative of excellent hardness. In fact, it had a much higher glass transition temperature than did the Plioway®EC1 resin which had a glass transition temperature (midpoint) of 56° C.

EXAMPLE 2

In this experiment a resin for exterior paints was synthesized by terpolymerizing PTBS, isobutyl methacrylate, and 2-ethylhexyl acrylate. In the procedure used 129.73 phm (parts by weight per 100 parts by weight of monomer) of water, 0.135 phm of potassium hydroxide, 0.52 phm of anhydrous sodium sulfate, 5.95 phm of unsaturated rosin acid soap, 0.30 phm of potassium persulfate, 25 phm of PTBS, 70 phm of isobutyl methacrylate, 5 phm of 2-ethylhexyl acrylate, and 0.5 phm of t-dodecyl mercaptan were charged into a polymerization reactor. The temperature at the start of the polymerization was about 45° C. During the polymerization the temperature of the polymerization medium increased to about 68° C. over a period of about 6 to 7 hours. The latex prepared by this procedure was subsequently coagulated with the resin made being recovered.

The solution and polymer properties of the resin made were then determined and compared with those of Pliolite®AC80 resin. Pliolite®AC80 resin is made by The Goodyear Tire & Rubber Company using the same procedure as was utilized in this experiment except that styrene is employed in place of the PTBS. The properties of the PTBS containing resin made in this experiment and Pliolite®AC80 are shown in Table II.

The viscosity (Brookfield LVT—Spindle 1 at 60 rpm) of the PTBS containing resin and the Pliolite®AC80 resin in Exxsol D30 solvent are shown in Table II. It should be noted that Exxsol D30 solvent contains less than one percent aromatics. As can be seen in Table II the PTBS containing resin is soluble in these nonaromatic solvents whereas the Pliolite®AC80 resin is not.

Table II also shows the C.S.T. of 25 weight percent solutions of the two resins in Exxsol D30 solvent. The C.S.T. temperatures reported in Table II were determined by freezing the polymer solution and then raising the temperature and recording the point at which cloudiness disappears. The weight average molecular weight (Mw), number average molecular weight (Mn), polydispersity (Pd), and midpoint glass transition temperature (Tg) of the resins are also reported in Table II.

TABLE II

| Property | Pliolite ® AC80 | PTBS Resin |
| --- | --- | --- |
| Viscosity in EXXSOL D30 | Insoluble | 39 mPa.s |
| C.S.T. in EXXSOL D30 | Insoluble | −7° C. |
| Mw | 90,100 | 53,900 |
| Mn | 41,400 | 180,400 |
| Pd | 2.2 | 3.3 |
| Tg(midpoint) | 54° C. | 61° C. |
| Yellowing Delta b* | 4.45 | 0.74 |

It is normally important for the resin to have a glass transition temperature of greater than about 50° C. to insure satisfactory hardness. The resin made with PTBS had a glass transition temperature (midpoint) of 61° C. which is indicative of excellent hardness. In fact, it had a much higher glass transition temperature than did the Pliolite®AC80 resin which has a midpoint glass transition temperature of 54° C.

Table II illustrates the resistance to yellowing Delta b* (in the L*, a*, b* system) under ultraviolet light for three weeks of the pure resins. The PTBS containing resin shows significantly less yellowing than standard Pliolite®AC80 resin.

While certain representative embodiments and details have been shown for the purpose of illustrating the subject invention, it will be apparent to those skilled in this art that various changes and modifications can be made therein without departing from the scope of the subject invention.

What is claimed is:

1. A resin which is particularly useful in making paraffinic solvent based paints, said resin being comprised of repeat units which are derived from (a) about 10 to about 55 weight percent para-tertiary-butyl styrene, (b) 0 to about 40 weight percent vinyl aromatic monomers in addition to the para-tertiary butyl styrene, (c) about 20 to about 80 weight percent isobutyl methacrylate, and about 2 to about 25 weight percent alkyl acrylate monomers.

2. A resin as specified in claim 1 wherein the alkyl acrylate monomer is 2-ethylhexyl acrylate.

3. A resin as specified in claim 2 wherein the vinyl aromatic monomer is styrene.

4. A resin as specified in claim 3 which is comprised of repeat units which are derived from (a) about 10 weight percent to about 30 weight percent para-tertiary butyl styrene, (b) about 20 weight percent to about 40 weight percent styrene, (c) about 25 weight percent to 45 weight percent isobutyl methacrylate, and (d) about 8 weight percent to about 25 weight percent 2-ethylhexyl acrylate.

5. A resin as specified in claim 3 which is comprised of repeat units which are derived from (a) about 15 weight percent to about 25 weight percent para-tertiary butyl styrene, (b) about 25 weight percent to about 35 weight percent styrene, (c) about 30 weight percent to 40 weight percent isobutyl methacrylate, and (d) about 10 weight percent to about 20 weight percent 2-ethylhexyl acrylate.

6. A resin as specified in claim 2 wherein the vinyl aromatic monomer is para methyl styrene.

7. A resin as specified in claim 6 which is comprised of repeat units which are derived from (a) about 10 weight percent to about 30 weight percent para-tertiary butyl styrene, (b) about 20 weight percent to about 40 weight percent para methyl styrene or a mixture of para methyl styrene and ortho methyl styrene, (c) about 25 weight percent to about 45 weight percent isobutyl methacrylate, and (d) about 5 weight percent to about 15 weight percent 2-ethylhexyl acrylate.

8. A resin as specified in claim 6 which is comprised of repeat units which are derived from (a) about 10 weight percent to about 30 weight percent para-tertiary butyl styrene, (b) about 20 weight percent to about 40 weight percent para-methylstyrene, (c) about 25 weight percent to 45 weight percent isobutyl methacrylate, and (d) about 8 weight percent to about 25 weight percent 2-ethylhexyl acrylate.

9. A resin as specified in claim 8 which is comprised of repeat units which are derived from (a) about 15 weight percent to about 25 weight percent para-tertiary butyl styrene, (b) about 25 weight percent to about 35 weight percent para-methylstyrene, (c) about 30 weight percent to 40 weight percent isobutyl methacrylate, and (d) about 10 weight percent to about 20 weight percent 2-ethylhexyl acrylate.

10. A resin as specified in claim 2 which is comprised of repeat units which are derived from (a) about 20 weight percent to about 30 weight percent para-tertiary butyl styrene, (b) about 65 weight percent to 75 weight percent isobutyl methacrylate, and (c) about 2 weight percent to about 8 weight percent 2-ethylhexyl acrylate.

11. A resin as specified in claim 1 which is comprised of repeat units which are derived from (a) about 10 weight percent to about 30 weight percent para-tertiary butyl styrene, (b) about 20 weight percent to about 40 weight percent vinyl aromatic monomers in addition to the para-tertiary butyl styrene, (c) about 25 weight percent to 45 weight percent isobutyl methacrylate, and (d) about 8 weight percent to about 25 weight percent alkyl acrylate monomers.

12. A resin as specified in claim 1 which is comprised of repeat units which are derived from (a) about 15 weight percent to about 25 weight percent para-tertiary butyl styrene, (b) about 25 weight percent to about 35 weight percent vinyl aromatic monomers in addition to the para-tertiary butyl styrene, (c) about 30 weight percent to 40 weight percent isobutyl methacrylate, and (d) about 10 weight percent to about 20 weight percent alkyl acrylate monomers.

13. A resin as specified in claim 1 which is comprised of repeat units which are derived from (a) about 20 weight percent to about 30 weight percent para-tertiary butyl styrene, (b) about 65 weight percent to about 75 weight percent isobutyl methacrylate, and (c) about 2 weight percent to about 8 weight percent alkyl acrylate monomers.

14. A resin as specified in claim 1 wherein the alkyl acrylate monomer is selected from the group consisting of ethyl acrylate, propyl acrylate, butyl acrylate, pentyl acrylate, hexyl acrylate, and 2-ethylhexyl acrylate.

15. A resin as specified in claim 14 wherein the vinyl aromatic monomer in addition to the para-tertiary butyl styrene contains from 8 to 14 carbon atoms.

16. A resin which is particularly useful in making paraffinic solvent based paints, said resin being comprised of repeat units which are derived from (a) about 15 weight percent to about 35 weight percent para-tertiary butyl styrene, (b) 0 weight percent to about 15 weight percent styrenem (c) about 60 weight percent to 80 percent isobutyl methacrylate, and (d) about 1 weight percent to about 10 weight percent 2-ethylhexyl acrylate.

* * * * *